July 5, 1938.    O. P. McCARTY    2,123,140
VOLTAGE SENSITIVE REVERSIBLE MOTOR

Filed March 2, 1937

Inventor:
Orin P. McCarty.
by Harry E. Dunham
His Attorney.

Patented July 5, 1938

2,123,140

UNITED STATES PATENT OFFICE 2,123,140

VOLTAGE SENSITIVE REVERSIBLE MOTOR

Orin P. McCarty, Pittsfield, Mass., assignor to General Electric Company, a corporation of New York Application March 2, 1937, Serial No. 128,628

5 Claims. (Cl. 172—120)

My invention relates to voltage sensitive reversible motors and it has for its object the provision of a simple, reliable and inexpensive alternating current motor which may be reversed automatically without the use of contacts by varying its applied voltage.

In practicing my invention, I utilize a motor having a main field winding and two opposed cross-field windings. In series with one of the cross-field windings, I connect a series resonant, non-linear circuit. The circuits of all three field windings are connected to be energized in accordance with the voltage of a supply circuit. Below a certain voltage the non-linear circuit is dissonant and its series-connected cross-field winding is overpowered by the other cross-field winding, thereby causing rotation of the motor in one direction. Upon a slight increase in voltage the non-linear circuit becomes resonant thereby greatly reducing its impedance whereby the cross-field winding in circuit therewith overpowers the other cross-field winding and causes a reversal of rotation of the motor.

My invention will be better understood from the following description taken in connection with the accompanying drawing and its scope will be pointed out in the appended claims.

Figure 1:
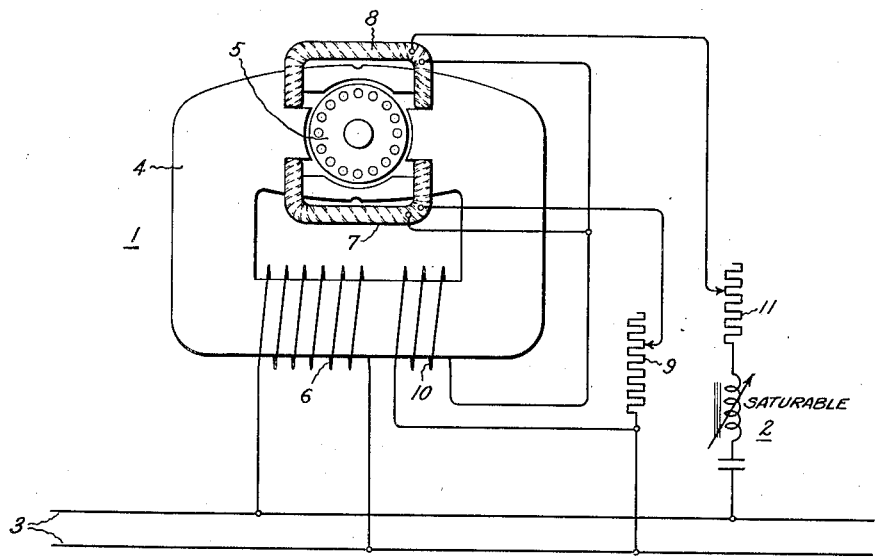
Figure 2:
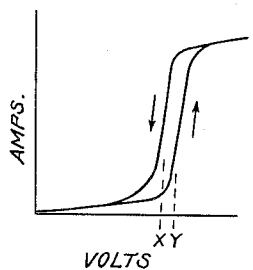

In the drawing, Fig. 1 is a schematic showing of an embodiment of my invention which will automatically reverse its direction of rotation with changes in voltage of ±1½ volts from a normal value of 110 volts, and Fig. 2 is a curve illustrating the characteristic of the series resonant nonlinear circuit.

Referring now to the drawing, the main elements of my circuit are an alternating current motor I and a non-linear series resonant circuit 2. These elements are connected to a variable voltage alternating current circuit 3.

Motor I is provided with a stator frame 4 and a rotor 5, shown by way of example as a conventional squirrel cage rotor. Placed on the stator is a main field winding 6 which is connected across the circuit 3 and which produces a main operating flux through the rotor 5. Placed in slots on opposite sides of the center of the rotor 5 are opposed cross or quadrature field windings 7 and 8. Winding 7 is energized through a rheostat 9 from a winding 10 on the stator which receives current by transformer action from the main field winding 6. The cross-field winding 8 is energized from across the supply circuit 3 in series with the non-linear circuit 2, a rheostat 11 and the winding 10 in series.

As windings 7 and 8 receive energization from winding 10 by transformer action, they may be likened to shading coils and the fluxes produced thereby are out of time phase with respect to the main flux produced by winding 6. As the fluxes of cross-field windings 7 and 8 are also 90° out of space phase with respect to the flux produced by the main field winding 6, the interactions of the fluxes produced by the windings 7 and 8 with the flux produced by winding 6 cause rotating fields to be set up, thereby tending to rotate the motor. However, as the fields produced by windings 7 and 8 are opposed, the directions of rotation of the rotating fields produced as a result of these windings are in opposite directions, and hence they tend to turn the motor in opposite directions.

The nonlinear circuit 2 consists of a capacitor and an iron core reactor. The iron core of the reactor is magnetically saturable, thereby changing the inductance value of the reactor so that changes in current can automatically cause this circuit to go from a dissonant condition to a resonant condition and vice versa.

In Fig. 2, this characteristic is clearly shown. If the voltage applied to the resonant circuit is increased from zero, the impedance of this circuit is initially relatively high and the current therethrough is relatively low up to a voltage value Y at which the current relatively abruptly increases. This is brought about by a resonant condition of the circuit. If now the voltage is decreased until the voltage X is reached the resonant circuit relatively abruptly becomes dissonant and its impedance increases rapidly thereby decreasing the current therethrough by a relatively large amount.

In the operation of my invention, the rheostat 9 is adjusted so that for voltage values of circuit 3 below voltage Y in Fig. 2, cross-field winding 7 over-powers cross-field winding 8 thereby causing rotation of the motor in one direction, say for example clockwise. If now the voltage of circuit 3 increases beyond Y the non-linear circuit 2 becomes resonant and the increase in current therethrough will cause the cross-field winding 8 to over-power the cross-field winding 7 thereby reversing the direction of rotation of the motor 8 and causing it to rotate counterclockwise. If the voltage now decreases until the voltage X is reached the nonlinear circuit again becomes dissonant and the cross-field winding 7 will again over-power the winding 8 and again cause reversal.

The above arrangement is useful for operating automatic voltage regulators in that rotation of the motor in one direction can cause any suitable regulating apparatus to raise the circuit voltage while rotation in the opposite direction can cause the regulating apparatus to lower the voltage. When so used the difference in voltage between X and Y in Fig. 2 will represent the so-called band width of the regulated voltage. The magnitude of the band width may be varied at will by changing the setting of rheostat 11. By reason of the slope of the volt-ampere characteristic of Fig. 2, and the load torque of a regulator, the motor will be stationary between the voltages X and Y. Hunting of the system is therefore prevented.

While I have shown and described a particular embodiment of my invention, it will be obvious to those skilled in the art that changes and modifications can be made therein and consequently I aim in the appended claims to cover all such changes and modifications as fall within the true spirit and scope of my invention.

What I claim as new and desire to secure by Letters Patent of the United States is:

1. In combination, an electric circuit, an electric motor having a main field winding and a pair of opposed cross-field windings the relative strength of whose energizations determines the direction of rotation of said motor, means for connecting all of said windings to be energized in accordance with the voltage of said circuit, non-linear volt-ampere characteristic means connected in circuit with one of said opposed cross-field windings, and adjustable means for changing the relative strength of the energizations of said windings independently of the non-linear action of said non-linear means.

2. In combination, a variable voltage alternating current circuit, an electric motor having a main field winding and a pair of opposed cross-field windings the relative strength of whose energizations determines the direction of rotation of said motor, means for connecting all of said windings to be energized in accordance with the voltage of said circuit, nonlinear volt-ampere characteristic means connected in circuit with one of said opposed cross-field windings, adjustable means for changing the relative strength of the energizations of said windings independently of the non-linear action of said non-linear means, and additional adjustable means for varying the limits of non-linear action of said non-linear means.

3. In combination, a variable voltage alternating current circuit, an electric motor having a main field winding and a pair of opposed cross-field windings the relative strength of whose energizations determines the direction of rotation of said motor, means for connecting all of said windings to be energized in accordance with the voltage of said circuit, a series resonant non-linear volt-ampere characteristic circuit connected in circuit with one of said opposed cross-field windings, adjustable means for changing the relative strength of the energizations of said windings independently of the non-linear action of said non-linear circuit, and a rheostat connected in series with said non-linear circuit for varying the limits of non-linear action of said non-linear circuit.

4. In combination, a variable voltage alternating current circuit, a reversible squirrel cage induction motor having a main field winding and a pair of opposed cross-field windings, means for energizing at least one of said cross-field windings by transformer action from said main field winding, and a voltage sensitive series resonant non-linear volt-ampere characteristic circuit connected in series with the other of said cross-field windings across said variable voltage alternating current circuit.

5. In combination, a variable voltage alternating current circuit, a reversible motor of the type used to drive an automatic voltage regulator, said motor having a stator frame and an induction motor rotor, a main field winding on said stator frame connected to be energized by said alternating current circuit, a pair of opposed cross-field windings on said frame, an additional winding on said frame adapted to be energized by transformer action from the main field winding, connections for energizing said cross-field winding from said auxiliary winding, a series resonant non-linear volt-ampere characteristic circuit comprising a capacitor and an adjustable saturable reactor connecter in circuit with one of said cross-field windings, and a rheostat connected in series with said nonlinear circuit.

ORIN P. McCARTY.